L. E. & E. L. PRESCOTT.
AUTOMOBILE SIGNAL.
APPLICATION FILED JULY 2, 1917.

1,269,214.

Patented June 11, 1918.
3 SHEETS—SHEET 1.

WITNESSES

INVENTORS
Lester E. Prescott,
and Eugene L. Prescott,
BY
ATTORNEY

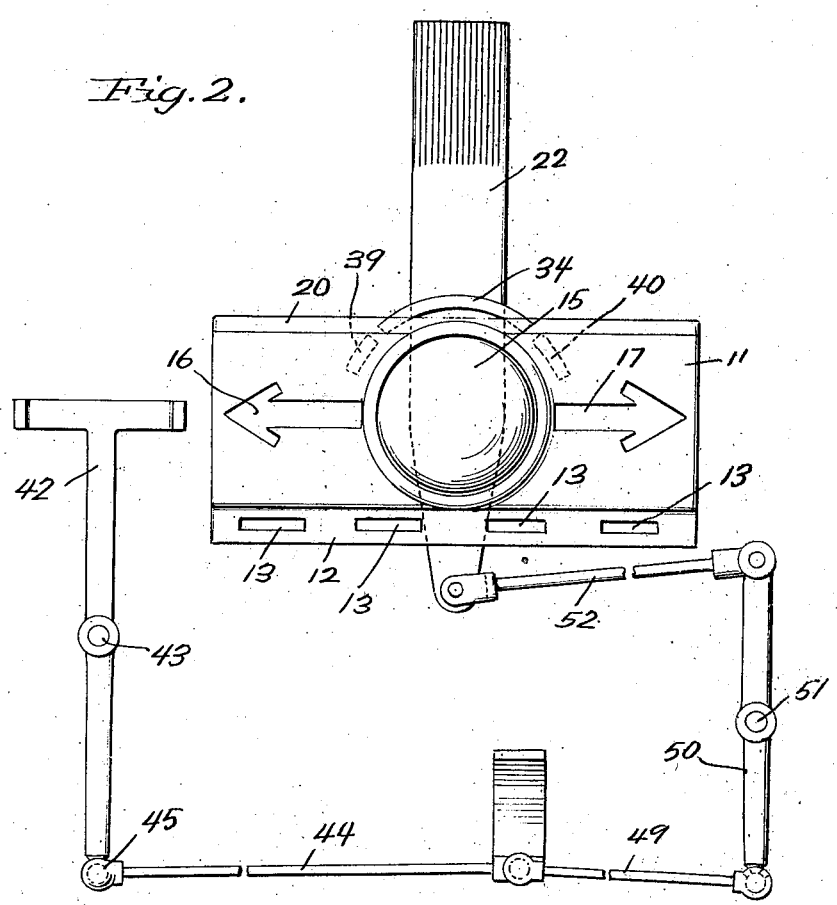
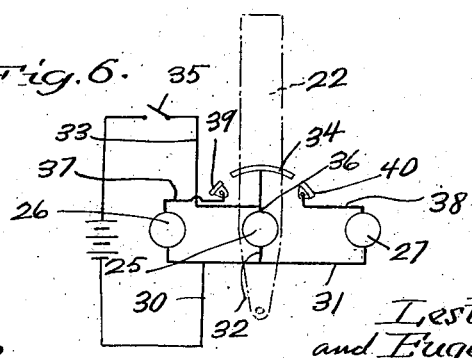

L. E. & E. L. PRESCOTT.
AUTOMOBILE SIGNAL.
APPLICATION FILED JULY 2, 1917.
1,269,214.
Patented June 11, 1918.
3 SHEETS—SHEET 3.
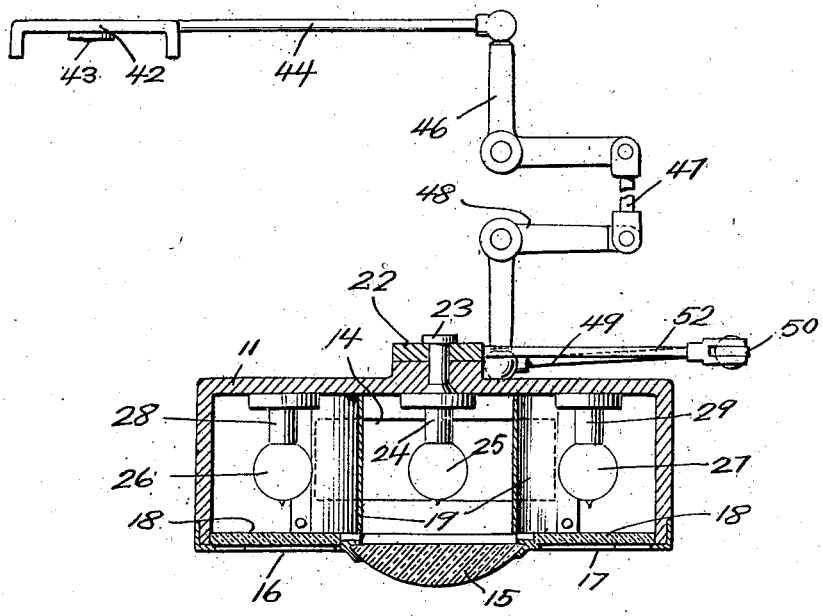
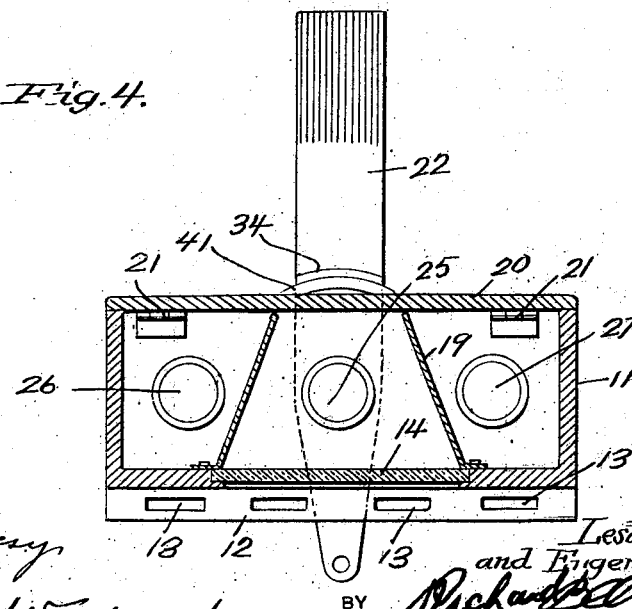
WITNESSES
INVENTOR
Lester E. Prescott,
and Eugene L. Prescott,
BY
ATTORNEY

UNITED STATES PATENT OFFICE.

LESTER E. PRESCOTT AND EUGENE L. PRESCOTT, OF SOUTH TACOMA, WASHINGTON.

AUTOMOBILE-SIGNAL.

1,269,214.	Specification of Letters Patent.	Patented June 11, 1918.

Application filed July 2, 1917.  Serial No. 178,193.

*To all whom it may concern:*

Be it known that we, LESTER E. PRESCOTT and EUGENE L. PRESCOTT, citizens of the United States, residing at South Tacoma, in the county of Pierce and State of Washington, have invented certain new and useful Improvements in Automobile-Signals, of which the following is a specification.

This invention relates to an improved automobile signal and the principal object of the invention is to provide a signal which may indicate the direction in which the car is to turn and which will serve as a rear light and also as a number illuminating light.

Another object of the invention is to so construct this signal that when the indicating arm or pointer is swung to one side, a light will be illuminated thus permitting the signal to be seen at night-time.

Another object of the invention is to so construct this signal that the rear light may be kept burning at all times and to further so construct the signal that the indicating arm may serve as a movable switch element to close a brake between stationary contacts.

Another object of the invention is to provide improved operating means for swinging the indicating arm from the neutral position to one side.

Another object of the invention is to provide a signal which will be very simple in construction and easy to operate.

This invention is illustrated in the accompanying drawings, wherein:—

Figure 1:
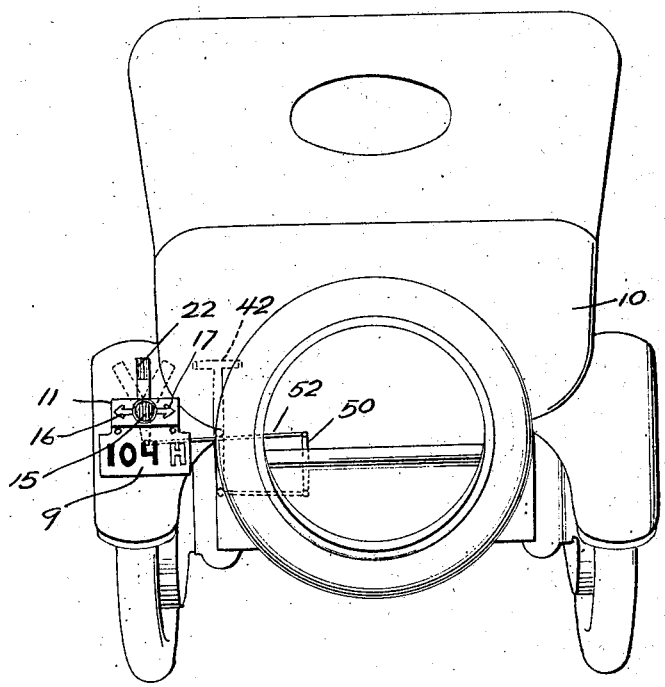
Figure 5:
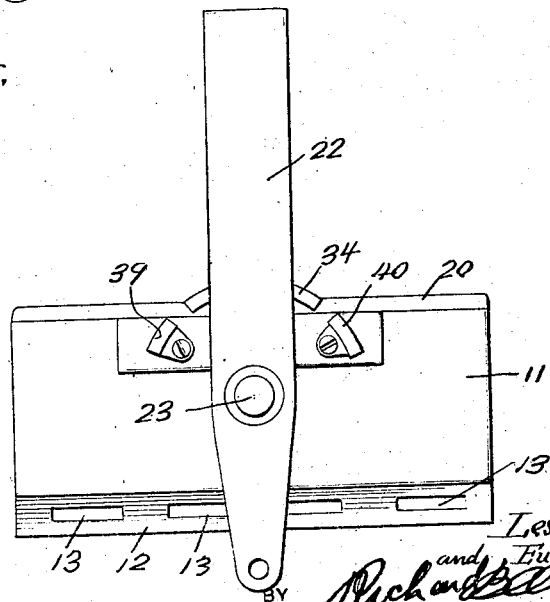

Figure 1 is a view showing an automobile in rear elevation with the improved signal in place, Fig. 2 is a view showing the improved signal in elevation, Fig. 3 is a view showing the operating mechanism of the signal in top plan and the housing in longitudinal section, Fig. 4 is a view showing the improved housing in vertical section, Fig. 5 is a view showing the improved housing in front elevation, and Fig. 6 is a view of the wiring diagram for the lighting of the improved signal.

This signal is mounted at a convenient point upon the automobile indicated in general by the numeral 10 and in the present illustration is shown positioned above the rear mud guard. The housing 11 is provided with a depending flange 12 having openings 13 formed therein thus permitting the number plate 9 to be suspended beneath the housing where it may be illuminated passing through the lens or transparent plate 14 in the bottom of the housing.

In the rear wall of this housing there is provided an opening covered by a lens 15 which will be preferably colored and will constitute the rear light. Openings 16 and 17 are cut in the rear wall upon opposite sides of the lens 15 and are covered by transparent plates 18 formed preferably of glass so that when the proper bulbs are illuminated, the light will shine through these indicating openings and show the direction in which the car is to turn. Partitions 19 are placed in the housing to divide the same into compartments as shown in Figs. 3 and 4 and in order to permit easy access to the interior of the housing for repair purposes there is provided a cover 20 hingedly mounted as shown at 21.

The direction indicating arm 22 is loosely mounted upon the stem 23 of the socket 24 for the electric bulb 25 and will normally remain in the upright position shown in full lines. It will thus be seen that the socket 24 not only provides means for carrying the bulb 25 but further provides means for pivotally mounting the indicating arm. Bulbs or lamps 26 and 27 are mounted in sockets 28 and 29 in the side compartments of the housing and when illuminated will serve to illuminate the direction indicating elements 16 and 17 to show the direction in which the car is to turn. These lamps or bulbs 26 and 27 are connected with the power wire 30 by means of the wire 31 which wire is provided with a branch 32 leading to the bulb 25. The return wire 33 leads from the contact arm 34 carried by the indicating arm 22 and is provided intermediate its length with a switch 35 permitting the circuit to be broken and extinguish the light 25 with which the return wire connects by means of branch 36. The return wires 37 and 38 for the lamps 26 and 27 communicate with the stationary contacts 39 and 40 and it will be readily seen that when the indicating arm is swung to one side, the circuit through the lamp 26 or the lamp 27 will be closed thus permitting this lamp to be lighted as well as the rear lamp 25. It has been stated that the wire 33 leads from the contact 34 but it is to be understood that if desired, a stationary contact 41 may be secured to the housing between the contacts 39 and 40 in which case the movable contact 34 would be positioned in a little higher plane and would then bridge the space between the contacts 41 and one of the side contacts when the arm is swung. If the stationary contact 41 is omitted and the wire connected directly with the contact 34, this contact will of course have overlapping engagement with the side contacts when swung thus preventing the ends of the contact strips from striking the ends of the contact strips 39 and 40.

In order to swing the indicating arm 22 there has been provided a foot lever 42 pivotally mounted in the foot board of the automobile as at 43 and having its lower end connected with the rod or link 44 by the socket joint 45. This link 44 is connected with the bell crank lever 46 from which leads a rod or link 47 connected with the bell crank lever 48 positioned adjacent the rear end of the automobile and having a rod or link 49 leading therefrom. This link 49 is connected with the lower end of the lever 50 pivotally mounted as shown at 51 and having a link 52 leading from its upper end and connected with the lower end of the indicating arm. When the automobile is in use at night, the switch 35 will be closed and the lamp 25 illuminated thus lighting the rear light and also illuminating the number board containing the license number of the automobile. Under normal conditions, the indicating arm will remain in a vertical position. If the driver of the automobile is about to turn a corner, the lever 42 will be moved in the direction in which the automobile is to turn, and through the medium of the links and levers connecting this lever 42 with the lower end of the indicating arm 22, movement will be transmitted to the indicating arm and this arm will be swung in the direction in which the turn is to be made. When this arm swings, the circuit through lamp either 26 or 27 will be closed and this lamp will be illuminated thus throwing a light through the pointer 16 or 17 and indicating in which direction, the automobile is to turn. After the turn has been made, the lever 42 will be returned to the normal position and the indicating arm will swing upwardly to the neutral position and the side lights extinguished. It will thus be seen that this device will operate very efficiently and permit one of the side lamps to be selectively lighted and at the same time permit the rear light 15 to be at all times illuminated. When the automobile is in use during the day, it is not necessary to have the lights illuminated and the switch 35 will then be opened thus breaking the circuit. This will not however prevent the indicating arm from being moved to indicate the direction in which the turn is to be made.

We have thus provided an automobile signal for indicating the direction in which a turn is to be made which signal will act as a rear light and also as an illuminating light for the license number.

What is claimed is:—

1. An automobile signal comprising a housing having partitions therein dividing the housing into side compartments and an intermediate compartment, sockets in the compartments, an indicating arm, the intermediate socket being extended to provide a pin passing through the indicating arm to pivotally mount the indicating arm, a main circuit passing through the intermediate socket to illuminate a lamp carried thereby, auxiliary circuits branching from the main circuit to illuminate lamps carried by the side sockets, the auxiliary circuits including stationary contacts carried by the housing and a movable contact carried by the indicating arm, and means for swinging the indicating arm to one side and bring the contact thereof into engagement with one of the stationary contacts and illuminate a selected side lamp.

2. An automobile signal comprising a housing divided into side compartments and an intermediate compartment, electrically energized indicators in the compartments, an indicating arm, the indicator of the intermediate compartment being provided with a pin passing through the indicator arm to pivotally mount the indicator arm, a main circuit passing through the indicator of the intermediate compartment to energize the same, auxiliary circuits to energize the indicators of the side compartments, the auxiliary circuits including stationary contacts and a movable contact carried by the indicating arm, and means for swinging the indicating arm to one side to bring the contacts thereof into engagement with one of the stationary contacts and energize the indicator of a selected side compartment.

In testimony whereof we affix our signatures in presence of two witnesses.

LESTER E. PRESCOTT.
EUGENE L. PRESCOTT.

Witnesses:
A. GOLDTHWAITE,
FANNIE MILLER.